(12) United States Patent
Akita

(10) Patent No.: US 9,942,373 B2
(45) Date of Patent: Apr. 10, 2018

(54) LIST GENERATION DEVICE, LIST DISTRIBUTION DEVICE, INCOMING-CALL-PROCESSING DEVICE, AND PROGRAM

(71) Applicant: TOBILA SYSTEMS, INC., Aichi (JP)

(72) Inventor: Atsushi Akita, Aichi (JP)

(73) Assignee: Tobila Systems, Inc., Aichi (JP)

( * ) Notice: Subject to any disclaimer, the term of this patent is extended or adjusted under 35 U.S.C. 154(b) by 0 days.

(21) Appl. No.: 15/107,698

(22) PCT Filed: Nov. 14, 2014

(86) PCT No.: PCT/JP2014/080194
§ 371 (c)(1),
(2) Date: Jun. 23, 2016

(87) PCT Pub. No.: WO2015/098347
PCT Pub. Date: Jul. 2, 2015

(65) Prior Publication Data
US 2016/0337495 A1    Nov. 17, 2016

(30) Foreign Application Priority Data
Dec. 27, 2013 (JP) .................................. 2013-272202

(51) Int. Cl.
*H04M 1/66* (2006.01)
*H04M 1/663* (2006.01)
(Continued)

(52) U.S. Cl.
CPC ............ *H04M 1/663* (2013.01); *H04L 43/16* (2013.01); *H04L 61/605* (2013.01);
(Continued)

(58) Field of Classification Search
None
See application file for complete search history.

(56) References Cited

U.S. PATENT DOCUMENTS

| | | | | |
|---|---|---|---|---|
| 2011/0026701 | A1* | 2/2011 | Kirchhoff | H04M 3/436 379/207.13 |
| 2013/0195264 | A1* | 8/2013 | Kirchhoff | H04M 3/436 379/212.01 |

(Continued)

FOREIGN PATENT DOCUMENTS

| | | |
|---|---|---|
| JP | 2011160029 A | 8/2011 |
| JP | 2012070246 A | 4/2012 |
| JP | 2013214963 A | 10/2013 |

OTHER PUBLICATIONS

PCT International Preliminary Report on Patentability and Written Opinion of the International Search Authority issued in corresponding PCT Application No. PCT/JP2014/080194, dated Feb. 24, 2015, pp. 1-15.

(Continued)

*Primary Examiner* — Diane Mizrahi
(74) *Attorney, Agent, or Firm* — MKG, LLC

(57) ABSTRACT

To increase the accuracy of identification of nuisance calls, a list generation device acquires, as input data, at least one of information included in second history information and an evaluation value stored in a user evaluation database. The list generation device calculates a nuisance level for a telephone numbers of each caller based on a factor determined by the acquired input data. The list generation device compares the calculated nuisance level with threshold to generate shared list including the telephone number of the caller who makes an incoming call identified as a nuisance call.

8 Claims, 10 Drawing Sheets

(51) Int. Cl.
*H04M 3/436* (2006.01)
*H04L 12/26* (2006.01)
*H04L 29/12* (2006.01)
*H04L 29/06* (2006.01)

(52) U.S. Cl.
CPC ...... *H04L 65/1076* (2013.01); *H04L 65/1079* (2013.01); *H04M 3/436* (2013.01)

(56) References Cited

U.S. PATENT DOCUMENTS

2016/0301653 A1* 10/2016 Kirchhoff ............. H04M 3/436
2017/0064076 A1* 3/2017 Hayakawa ............ H04M 3/436

OTHER PUBLICATIONS

PCT International Search Report issued in corresponding PCT Application No. PCT/JP2014/080194, dated Feb. 24, 2015, pp. 1-2.
PCT Written Opinion of the International Search Authority issued in PCT/JP2014/080194, dated Feb. 24, 2015, pp. 1-7.

* cited by examiner

| | | | |
|---|---|---|---|
| DATE AND TIME OF REGISTRATION | — | NOVEMBER 02, 2013, 7:00 | ... |
| OPERATION INFORMATION<br>1: REJECTION OPERATION<br>2: PERMISSION OPERATION<br>3: CORRESPOND TO NEITHER OF OPERATIONS | 3 | 1 | ... |
| IDENTIFICATION RESULT<br>1: REGISTERED IN REJECTION LIST<br>2: REGISTERED IN PERMISSION LIST<br>3: REGISTERED IN SHARED LIST<br>4: REGISTERED IN NONE OF LISTS | 3 | 4 | ... |
| CALL TIME (SECOND) | 0 | 3 | ... |
| TALK TIME (SECOND) | 0 | 10 | ... |
| DATE AND TIME OF INCOMING CALL | NOVEMBER 01, 2013, 4:00 | NOVEMBER 02, 2013, 2:00 | ... |
| TELEPHONE NUMBER OF CALLER | 03-3456-**** | 03-5678-**** | ... |

FIG. 7

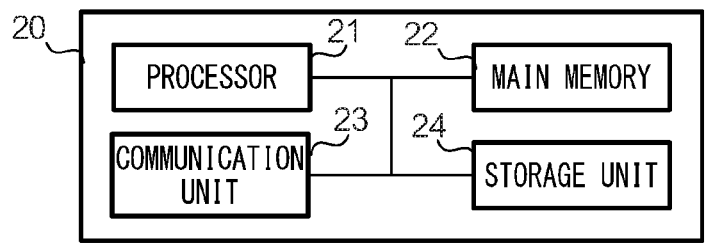
FIG. 8
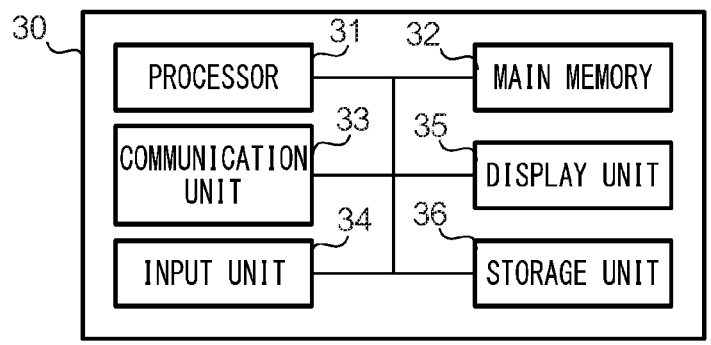
FIG. 9
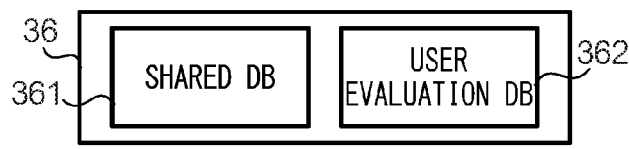
FIG. 10
| 361 | TELEPHONE NUMBER OF CALLER | NUISANCE LEVEL |
|---|---|---|
| | 03-3456-**** | ... |
| | 03-4567-**** | ... |
| | ... | ... |
FIG. 11
| 362 | TERMINAL ID | EVALUATION VALUE |
|---|---|---|
| | 001 | 5 |
| | 002 | 10 |
| | 003 | 1 |
| | ... | ... |
FIG. 12

| | | |
|---|---|---|
| PERMISSION NUMBER | | 1 |
| REJECTION NUMBER | | 3 |
| NUMBER OF INCOMING CALL | | 100 |
| DATE AND TIME OF REGISTRATION | – | NOVEMBER 02, 2013, 7:00 | ... |
| OPERATION INFORMATION<br>1:REJECTION OPERATION<br>2:PERMISSION OPERATION<br>3:CORRESPOND TO NEITHER OF OPERATIONS | 3 | 1 | ... |
| IDENTIFICATION RESULT<br>1:REGISTERED IN REJECTION LIST<br>2:REGISTERED IN PERMISSION LIST<br>3:REGISTERED IN SHARED LIST<br>4:REGISTERED IN NONE OF LISTS | 3 | 4 | ... |
| CALL TIME (SECOND) | 0 | 3 | ... |
| TALK TIME (SECOND) | 0 | 10 | ... |
| DATE AND TIME OF INCOMING CALL | NOVEMBER 01, 2013, 4:00 | NOVEMBER 02, 2013, 2:00 | ... |
| TELEPHONE NUMBER OF CALLER | 03-3456-**** | 03-5678-**** | ... |
| TERMINAL ID | | 001 |

LIST GENERATION DEVICE, LIST DISTRIBUTION DEVICE, INCOMING-CALL-PROCESSING DEVICE, AND PROGRAM

TECHNICAL FIELD

The present invention relates to a technique for identifying nuisance calls.

BACKGROUND ART

Some examples of conventional techniques for preventing nuisance calls are described in JP2012-70246A. JP2012-70246A discloses a technique for extracting, from incoming history information of a telephone, a telephone number of a caller that corresponds to the condition in which a number of calls made per unit of time is greater than or equal to N times, and a call time is smaller than or equal to M seconds, and to reject an incoming call from this caller.

SUMMARY OF INVENTION

Technical Problem

In the technique described in JP2012-70246A, the identification of nuisance calls is performed based on only the frequency of incoming calls and the call time. Thus some nuisance calls may fail to be identified as such, or some normal calls may be erroneously identified as nuisance calls.

SUMMARY

It is an object of the present invention to increase the accuracy of identification of nuisance calls.

In the present invention, there is provided a list generation device that generates a list used for identifying whether an incoming call received from a telephone number is a nuisance call, the device including: a first calculation unit that calculates, for a telephone number, a first index value serving as an index used for identifying a nuisance call based on at least two of the following factors: (1) whether a first user who receives an incoming call from the telephone number performs a first operation to reject an incoming call from the telephone number, or performs a second operation to permit an incoming call from the telephone number, (2) when the first user performs the first operation for the telephone number, whether another user who performs the second operation for the telephone number satisfies a predetermined condition, (3) whether an incoming call from the telephone number has already been identified as a nuisance call, (4) an upper limit of a value added by the first user to an index used for identifying whether an incoming call from the telephone number is a nuisance call, (5) an area where a telephone receiving an incoming call from the telephone number is used, (6) a talk time in response to an incoming call received from the telephone number, (7) a total number of users who perform the first operation for the telephone number, (8) a call time of an incoming call received from the telephone number, (9) a period of time during which an incoming call is received from the telephone number, (10) an evaluation value assigned to the first user, (11) a number of times the first operation or the second operation is performed by the first user during a predetermined period, and (12) when the first user performs the first operation for the telephone number, whether the telephone number is registered in a predetermined database; and a generation unit that generates, by comparing the first index value calculated by the first calculation unit with a first threshold, a list including a telephone number of a caller who makes an incoming call identified as a nuisance call.

The first index value calculated by the first calculation unit may increase in a case where: in the factor (1), the first user performs the first operation, in the factor (3), the incoming call has already been identified as a nuisance call, in the factor (5), a number of users in the area is smaller than a second threshold, in the factor (6), the talk time is greater than zero, in the factor (7), the total number of users reaches a third threshold, in the factor (8), the call time is smaller than a fourth threshold, in the factor (9), the period of time during which the incoming call is received is a predetermined period, in the factor (10), when the first user performs the first operation, the evaluation assigned to the first user is greater than a fifth threshold, or in the factor (12), the telephone number is not registered in the predetermined database.

The first index value calculated by the first calculation unit may decrease in a case where: in the factor (1), the first user performs the second operation, or in the factor (7), the total number of users is zero.

A variation in the first index value affected by the factor (3), (5), (6), (7), (8), (9), (10), or (12) may be smaller than a variation in the first index value affected by the factor (1).

When the other user satisfies the predetermined condition in the factor (2), the first calculation unit may add a value smaller than another value that is to be added when the first user performs the first operation in the factor (1), to calculate the first index value.

When a sum of a value to be added by the first user exceeds the upper limit in the factor (4), the first calculation unit may calculate the first index value without adding a value in excess of the upper limit.

The upper limit may be smaller than the first threshold.

When the number of times the first operation or the second operation is performed is greater than a sixth threshold in the factor (11), the first calculation unit may calculate the first index value by adding or subtracting a value smaller than another value that is to be added or to be subtracted when the first user performs the first operation or the second operation in the factor (1), or without reflecting the first operation or the second operation performed by the first user in the first index value.

The list generation device may further include a changing unit that changes the first threshold based on at least one of the factors (2), (3), (5), (6), (7), (8), (9), (10), and (12).

The list may include a second index value determined based on the first index value calculated by the first calculation unit, together with the telephone number of the caller.

The list generation device may further include a second calculation unit that calculates, based on a total number of times an incoming call is received at the telephone, a total number of times the first operation is performed by the first user, and a total number of times the second operation is performed by the first user, a value representing an accuracy of identification of a nuisance call based on the list; and a first output unit that outputs the value calculated by the second calculation unit.

In the present invention, there is also provided a list distribution device including: a communication unit that transmits, by communicating with both a list generation device that generates a list used for identifying whether an incoming call received from a telephone number is a nuisance call, and an incoming-call-processing device, the list generated by the list generation device to the incoming-callprocessing device, and wherein the list is generated so as to include a telephone number of a caller who makes an incoming call identified as a nuisance call by the steps of: calculating, for a telephone number, a first index value serving as an index for identifying a nuisance call based on at least two of the following factors; (1) whether a first user who receives an incoming call from the telephone number performs a first operation to reject an incoming call from the telephone number, or performs a second operation to permit an incoming call from the telephone number, (2) when the first user performs the first operation for the telephone number, whether another user who performs the second operation for the telephone number satisfies a predetermined condition, (3) whether an incoming call from the telephone number has already been identified as a nuisance call, (4) an upper limit of a value added by the first user to an index used for identifying whether an incoming call from the telephone number is a nuisance call, (5) an area where a telephone receiving an incoming call from the telephone number is used, (6) a talk time in response to an incoming call received from the telephone number, (7) a total number of users who perform the first operation for the telephone number, (8) a call time of an incoming call received from the telephone number, (9) a period of time during which an incoming call is received from the telephone number, (10) an evaluation value assigned to the first user, (11) a number of times the first operation or the second operation is performed by the first user during a predetermined period, and (12) when the first user performs the first operation for the telephone number, whether the telephone number is registered in a predetermined database; and comparing the calculated first index value with a first threshold.

In the present invention, there is further provided an incoming-call-processing device including: an incoming-call-processing unit that performs a predetermined processing for an incoming call received at a telephone based on a list used for identifying whether an incoming call from a telephone number is a nuisance call, and wherein the list is generated so as to include a telephone number of a caller who makes an incoming call identified as a nuisance call by the steps of: calculating, for a telephone number, a first index value serving as an index used for identifying a nuisance call based on at least two of the following factors: (1) whether a first user who receives an incoming call from the telephone number performs a first operation to reject an incoming call from the telephone number, or performs a second operation to permit an incoming call from the telephone number, (2) when the first user performs the first operation for the telephone number, whether another user who performs the second operation for the telephone number satisfies a predetermined condition, (3) whether an incoming call from the telephone number has already been identified as a nuisance call, (4) an upper limit of a value added by the first user to an index used for identifying whether an incoming call from the telephone number is a nuisance call, (5) an area where a telephone receiving an incoming call from the telephone number is used, (6) a talk time in response to an incoming call received from the telephone number, (7) a total number of users who perform the first operation for the telephone number, (8) a call time of an incoming call received from the telephone number, (9) a period of time during which an incoming call is received from the telephone number, (10) an evaluation value assigned to the first user, (11) a number of times the first operation or the second operation is performed by the first user during a predetermined period, and (12) when the first user performs the first operation for the telephone number, whether the telephone number is regis-tered in a predetermined database; and comparing the calculated first index value with a first threshold.

In the present invention, there is further provided a program for causing a computer to perform a step of performing a predetermined processing for an incoming call received at a telephone based on a list used for identifying whether an incoming call from a telephone number is a nuisance call, wherein the list is generated so as to include a telephone number of a caller who makes an incoming call identified as a nuisance call by the steps of: calculating, for a telephone number, a first index value serving as an index used for identifying a nuisance call based on at least two of the following factors: (1) whether a first user who receives an incoming call from the telephone number performs a first operation to reject an incoming call from the telephone number, or performs a second operation to permit an incoming call from the telephone number, (2) when the first user performs the first operation for the telephone number, whether another user who performs the second operation for the telephone number satisfies a predetermined condition, (3) whether an incoming call from the telephone number has already been identified as a nuisance call, (4) an upper limit of a value added by the first user to an index used for identifying whether an incoming call from the telephone number is a nuisance call, (5) an area where a telephone receiving an incoming call from the telephone number is used, (6) a talk time in response to an incoming call received from the telephone number, (7) a total number of users who perform the first operation for the telephone number, (8) a call time of an incoming call received from the telephone number, (9) a period of time during which an incoming call is received from the telephone number, (10) an evaluation value assigned to the first user, (11) a number of times the first operation or the second operation is performed by the first user during a predetermined period, and (12) when the first user performs the first operation for the telephone number, whether the telephone number is registered in a predetermined database; and comparing the calculated first index value with a first threshold.

According to the present invention, it is possible to increase the accuracy of identification of nuisance calls.

BRIEF DESCRIPTION OF THE DRAWINGS

FIG. 7 is a diagram showing an example of first history information.

FIG. 8 is a diagram showing a hardware configuration of a list distribution device.

FIG. 9 is a diagram showing a hardware configuration of a list generation device.

FIG. 10 is a diagram showing an example of data stored in a storage unit.

FIG. 11 is a diagram showing an example of a shared DB.

FIG. 12 is a diagram showing an example of a user evaluation DB.

FIG. 15 is a diagram showing an example of second history information.

DETAILED DESCRIPTION

The present invention will be described in detail below with reference to specific embodiments. However, it is to be understood that the present invention is not limited to the following embodiments.

1. Configuration 1-1. Overall Configuration of Communication System 1

Figure 1:
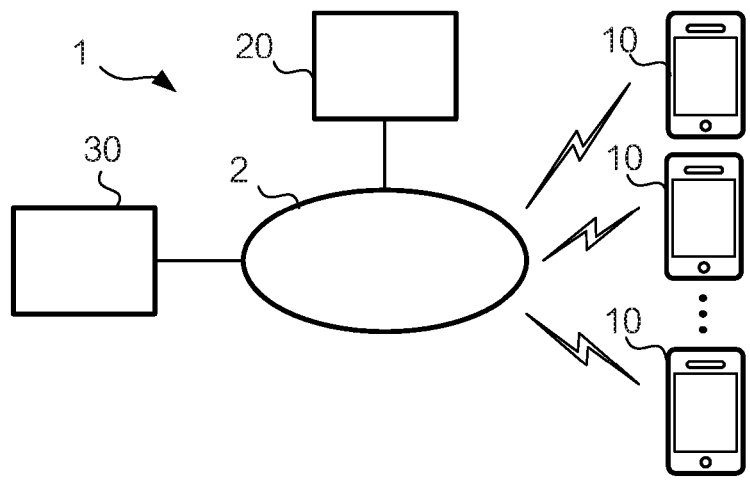
FIG. 1 is a diagram showing an overall configuration of a communication system.

FIG. 1 is a diagram showing an overall configuration of communication system 1. Communication system 1 includes a plurality of mobile phone terminals 10, list distribution device 20, and list generation device 30. The plurality of mobile phone terminals 10, list distribution device 20 and list generation device 30 are connected via network 2 including a mobile communication network and the Internet.

Communication system 1 provides an incoming-call-control service for preventing nuisance calls to users of mobile phone terminals 10. Here, a nuisance call is a call that a receiver of the call has no reason or wish to receive. Mobile phone terminals 10 are, for example, mobile phones or smart phones. Each mobile phone terminal 10 serves as, in addition to a telephone, an incoming-call-processing device performing a process to control incoming nuisance calls. List generation device 30 generates shared list 173 used for the identification of nuisance calls. List distribution device 20 distributes shared list 173 generated by list generation device 30 to mobile phone terminals 10.

1-2. Configuration of Mobile Phone Terminal 10

Figure 2:
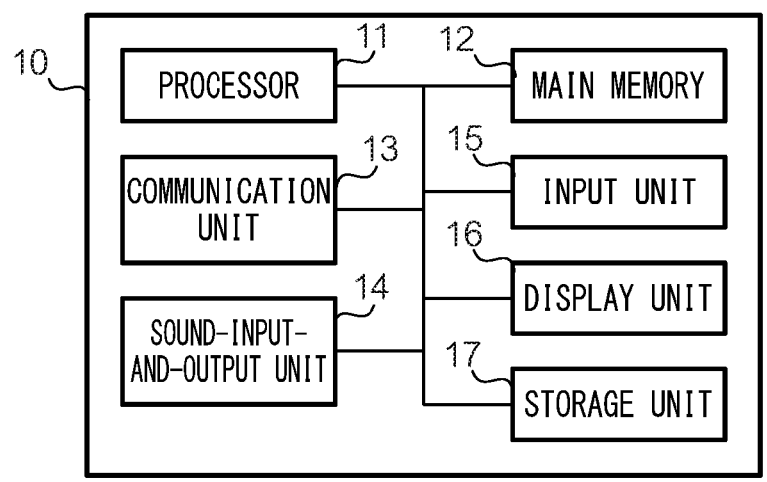
FIG. 2 is a diagram showing a hardware configuration of a mobile phone terminal.

FIG. 2 is a diagram showing a hardware configuration of mobile phone terminal 10. Mobile phone terminal 10 includes processor 11, main memory 12, communication unit 13, sound-input-and-output unit 14, input unit 15, display unit 16, and storage unit 17.

Processor 11 includes, for example, a CPU (Central Processing Unit). Processor 11 controls various units of mobile phone terminal 10 by executing a program stored in storage unit 17. Main memory 12 includes, for example, a RAM (Random Access Memory). Main memory 12 temporarily stores a program and data. Main memory 12 is used as a work area when processor 11 executes the program.

Communication unit 13 is a communication interface connected to network 2. Communication unit 13 communicates with list distribution device 20 via network 2. Sound-input-and-output unit 14 includes, for example, a microphone and a speaker. Sound-input-and-output unit 14 inputs and outputs sounds. Input unit 15 includes, for example, a touch panel and input keys. Input unit 15 inputs a signal to processor 11 in response to an operation of the user. Display unit 16 includes, for example, a liquid crystal display. Display unit 16 displays a variety of information. Storage unit 17 includes, for example, a flash memory. The storage unit 17 stores various programs and data.

Figure 3:
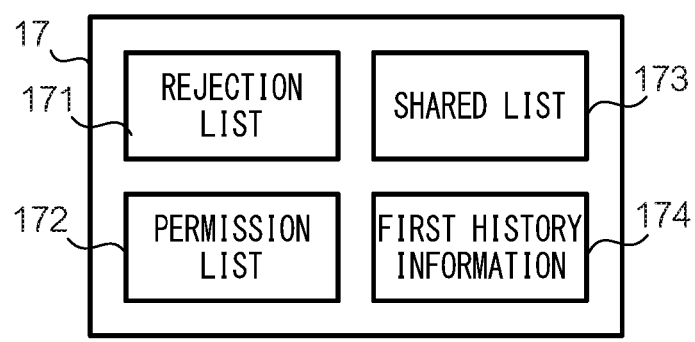
FIG. 3 is a diagram showing an example of data stored in a storage unit.

FIG. 3 is a diagram showing an example of data stored in storage unit 17. Storage unit 17 stores rejection list 171, permission list 172, shared list 173, and first history information 174.

Figure 4:
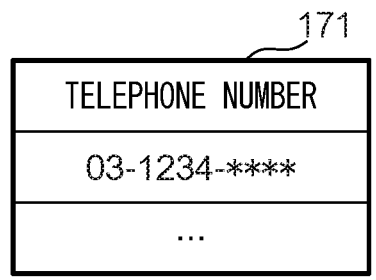
FIG. 4 is a diagram showing an example of a rejection list.

FIG. 4 is a diagram showing an example of rejection list 171. Rejection list 171 includes a telephone number from which an incoming call is rejected by an operation of the user. For example, when the user performs, using input unit 15, an operation to reject an incoming call from telephone number "03-1234-**" (hereinafter referred to as a "rejection operation"), telephone number "03-1234-**" is added to rejection list 171 as shown in FIG. 4. The rejection operation is an example of a "first operation" of the present invention.

Figure 5:
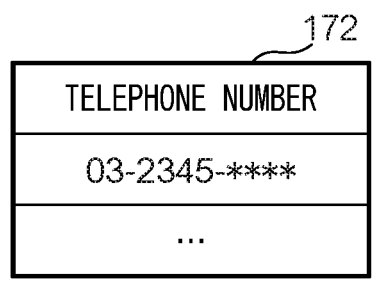
FIG. 5 is a diagram showing an example of a permission list.

FIG. 5 is a diagram showing an example of permission list 172. Permission list 172 includes a telephone number from which an incoming call is permitted by an operation of the user. For example, when the user performs, using input unit 15, an operation to permit an incoming call from telephone number "03-2345-**" (hereinafter referred to as a "permission operation"), telephone number "03-2345-**" is added to permission list 172 as shown in FIG. 5. The permission operation is an example of a "second operation" of the present invention. Permission list 172 may also include a telephone number registered in a telephone directory by an operation of the user.

Figure 6:
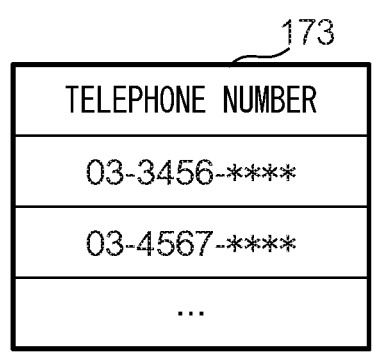
FIG. 6 is a diagram showing an example of a shared list.

FIG. 6 is a diagram showing an example of shared list 173. Shared list 173 includes a telephone number of a caller who makes an incoming call identified as a nuisance call by list generation device 30. Shared list 173 is generated by list generation device 30, and is provided to mobile phone terminals 10 through list distribution device 20.

FIG. 7 is a diagram showing an example of first history information 174. First history information 174 represents the history of an incoming call in mobile phone terminal 10. First history information 174 includes a telephone number of the caller, a date and time of the incoming call, a talk time, a call time, an identification result, operation information, and a date and time of the registration.

The telephone number of the caller is that of the caller who makes an incoming call received at mobile phone terminal 10. The date and time of the incoming call is the date and time when mobile phone terminal 10 receives the incoming call. The talk time is the period from the start of talking to the end of talking during the call received at mobile phone terminal 10. The call time is the period from the reception of the incoming call at mobile phone terminal 10 to the start of the talk time, or the period from the reception of the incoming call at mobile phone terminal 10 to the end of the call without any talk time taking place.

The identification result is information representing the identification result whether the telephone number of the caller is registered in rejection list 171, permission list 172, or shared list 173. In the example shown in FIG. 7, when the telephone number of the caller is included in rejection list 171, value "1" is stored as the identification result. When the telephone number of the caller is included in permission list 172, value "2" is stored as the identification result. When the telephone number of the caller is included in shared list 173, value "3" is stored as the identification result. When the telephone number of the caller is included in none of the lists, value "4" is stored as the identification result.

The operation information is information representing whether the rejection operation or the permission operation is performed for the telephone number of the caller. In the example shown in FIG. 7, when the rejection operation is performed, value "1" is stored as the operation information.

When the permission operation is performed, value "2" is stored as the operation information. When neither the rejection operation nor the permission operation is performed, value "3" is stored as the operation information. The date and time of the registration is the date and time when the telephone number of the caller is registered in rejection list 171 or permission list 172; namely, the date and time when the rejection operation or permission operation is performed for the telephone number of the caller.

The telephone number of the caller, the date and time of the incoming call, the talk time, the call time, and the identification result are stored when mobile phone terminal 10 receives the incoming call. The operation information and the date and time of the registration are stored when the user performs the rejection operation or the permission operation.

1-3. Configuration of List Distribution Device 20

FIG. 8 is a diagram showing a hardware configuration of list distribution device 20. List distribution device 20 includes processor 21, main memory 22, communication unit 23, and storage unit 24.

Processor 21 includes, for example, a CPU. Processor 21 controls various units of list distribution device 20 by executing a program stored in storage unit 24. Main memory 22 includes, for example, a RAM. Main memory 22 temporarily stores a program and data. Main memory 22 is used as a work area when processor 21 executes a program. Communication unit 23 is a communication interface connected to network 2. Communication unit 23 performs communications with mobile phone terminal 10 and list generation device 30 via network 2. Storage unit 24 includes, for example, a hard disk. Storage unit 24 stores various programs and data.

1-4. Configuration of List Generation Device 30

FIG. 9 is a diagram showing a hardware configuration of list generation device 30. List generation device 30 includes processor 31, main memory 32, communication unit 33, input unit 34, display unit 35, and storage unit 36.

Processor 31 includes, for example, a CPU. Processor 31 controls various units of list generation unit 30 by executing a program stored in storage unit 36. Main memory 32 includes, for example, a RAM. Main memory 32 temporarily stores a program and data. Main memory 32 is used as a work area when processor 31 executes a program.

Communication unit 33 is a communication interface connected to network 2. Communication unit 33 communicates with list distribution device 20 via network 2. Input unit 34 includes, for example, a mouse and a keyboard. Input unit 34 inputs a signal to processor 31 in response to an operation of the user. Display unit 35 includes, for example, a liquid crystal display. Display unit 35 displays a variety of information. Storage unit 36 includes, for example, a hard disk. Storage unit 36 stores various programs and data.

FIG. 10 is a diagram showing an example of data stored in storage unit 36. Storage unit 36 stores a shared database (hereinafter referred to as a "shared DB") 361, and a user evaluation database (hereinafter referred to as a "user evaluation DB") 362.

FIG. 11 is a diagram showing an example of shared DB 361. Shared DB 361 includes a telephone number of a caller and a nuisance level. The telephone number of the caller is that of the caller who makes an incoming call received at at least one mobile phone terminal 10. The nuisance level serves as an index used for identifying nuisance calls.

FIG. 12 is a diagram showing an example of user evaluation DB 362. User evaluation DB 362 stores a terminal ID and an evaluation value. The terminal ID is identification information of mobile phone terminal 10. Each mobile phone terminal 10 is usually used by one user. The terminal ID is therefore also used as identification information of the user. An evaluation value is assigned to the user of each mobile phone terminal 10. For example, the evaluation value is determined based on the following items:

(a) Appropriateness of operations
(b) A number of times an incoming call is received from a telephone number included in shared list 173
(c) A period of use of the service
(d) A variation in a number of times of the operation or a variation in a total number of incoming calls (a) Appropriateness of Operations For example, when a telephone number is registered in shared list 173 after the user performs the rejection operation for this telephone number, this user's appropriateness of operations will become higher. When the user's appropriateness of operations becomes higher in this way, the evaluation value of the user increases. Meanwhile, for example, when the user performs the permission operation for the telephone number registered in shared list 173, this user's appropriateness of operations will become lower. When the user's appropriateness of operations becomes lower in this way, the evaluation value of the user decreases.

(b) A Number of Times an Incoming Call is Received from a Telephone Number Included in Shared List 173

When a number of times an incoming call is received from a telephone number included in shared list 173 reaches a predetermined number of times, the user of mobile phone terminal 10 may be the target of nuisance calls. When the user of mobile phone terminal 10 is the target of nuisance calls in this way, information acquired from this user is expected to be highly important. The evaluation value of this user therefore increases.

(c) A Period of Use of the Service

When a period of use of the incoming call-rejection service reaches a predetermined period, the evaluation value of this user increases.

(d) A Variation in a Number of Times of the Operation or a Variation in a Total Number of Incoming Calls A number of times the rejection operation or permission operation is performed by one user, or a number of incoming calls received at mobile phone terminal 10 used by one user is tallied at predetermined time intervals. A variation in the tallied number of times or a variation in the tallied number of incoming calls is then calculated. When the variation is greater than a threshold, which is set for the variation, this user may have been using mobile phone terminal 10 for a special purpose (e.g., for business). In this case, the evaluation value of this user decreases.

1-5. Functional Configuration of Communication System 1

Figure 13:
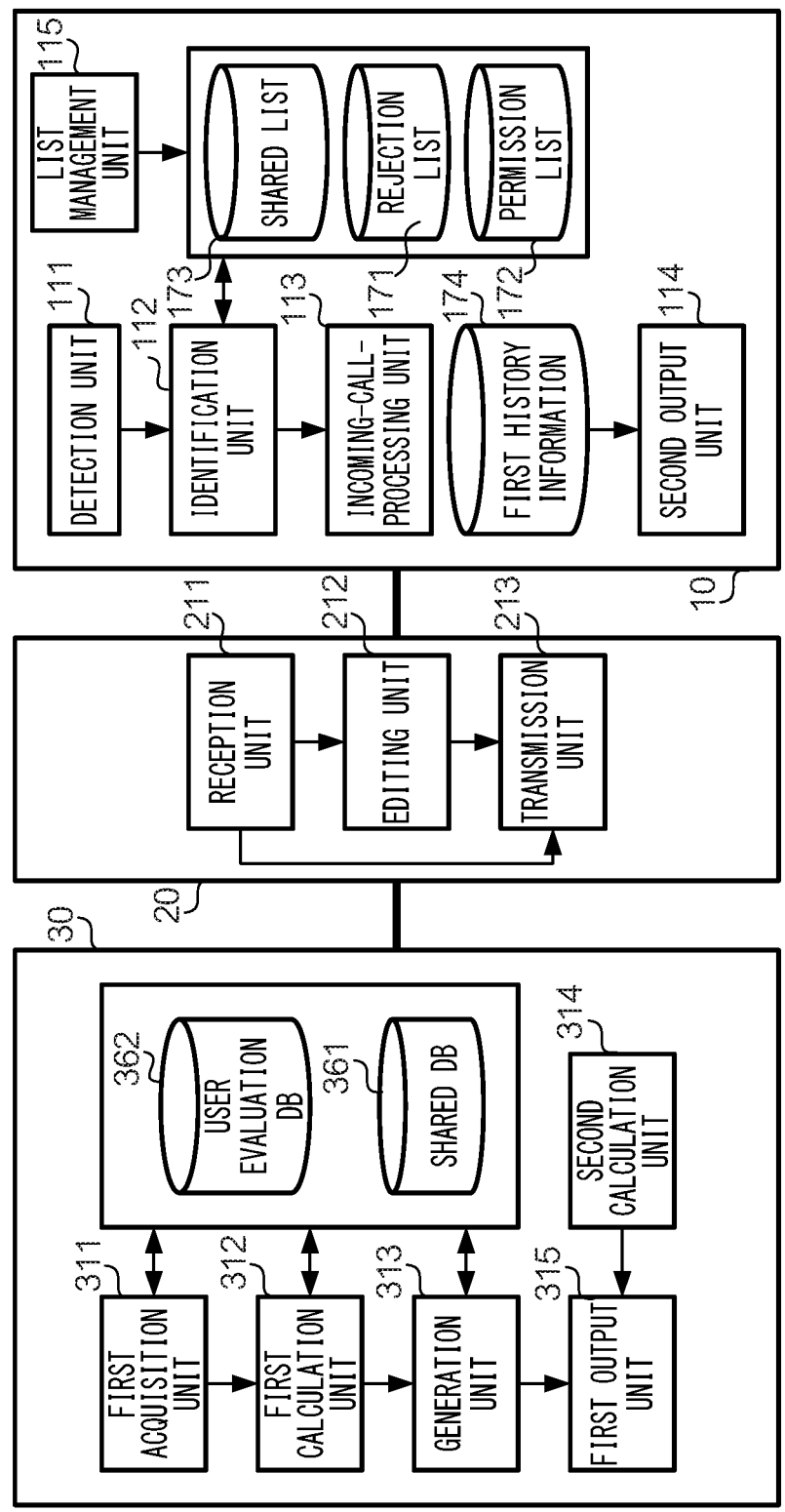
FIG. 13 is a diagram showing a functional configuration of the communication system.

FIG. 13 is a diagram showing a functional configuration of communication system 1. Mobile phone terminal 10 serves as detection unit 111, identification unit 112, incoming-call-processing unit 113, second output unit 114, and list management unit 115 by processor 11 executing at least one program.

Detection unit 111 detects a telephone number of a caller who makes an incoming call received at mobile phone terminal 10. Identification unit 112 identifies whether the telephone number detected by detecting unit 111 is included in shared list 173. Shared list 173 is an example of a list of the present invention. Incoming-call-processing unit 113 performs a predetermined process based on shared list 173 for the incoming call received at mobile phone terminal 10. For example, when the telephone number detected by detecting unit 111 is identified by identification unit 112 as a number to be included in shared list 173, incoming-call-processing unit 113 rejects the incoming call to mobile phone terminal 10 from this telephone number. Second output unit 114 outputs the terminal ID of mobile phone terminal 10 and first history information 174. List management unit 115 manages rejection list 171, permission list 172, and shared list 173 that are stored in storage unit 17.

List distribution device 20 serves as reception unit 211, editing unit 212, and transmission unit 213 by processor 21 executing at least one program.

Reception unit 211 receives information from list generation device 30 or mobile phone terminals 10 via communication unit 23. For example, reception unit 211 receives first history information 174 transmitted from each mobile phone terminal 10 via communication unit 23. Reception unit 211 also receives shared list 173 generated by list generation device 30 via communication unit 23. Editing unit 212 edits first history information 174 acquired by reception unit 211 to generate second history information 175. Transmission unit 213 transmits information to list generation device 30 or mobile phone terminals 10 via communication unit 23. For example, transmission unit 213 transmits second history information 175 generated by editing unit 212 to list generation device 30 via communication unit 23. Transmission unit 213 also transmits shared list 173 received by reception unit 211 to mobile phone terminals 10 via communication unit 23.

List generation device 30 serves as first acquisition unit 311, first calculation unit 312, generation unit 313, second calculation unit 314, and first output unit 315 by processor 31 executing at least one program.

First acquisition unit 311 acquires, as input data, at least one of information included in second history information 175 and the evaluation value stored in user evaluation DB 362. First calculation unit 312 calculates a nuisance level for a telephone number of each caller based on a factor determined based on the input data acquired by first acquisition unit 311. The nuisance level is an example of a first index value of the present invention. Generation unit 313 generates shared list 173 by comparing the nuisance level calculated by first calculation unit 312 with threshold T1 (an example of a first threshold). First output unit 315 outputs shared list 173 generated by generation unit 313. Second calculation unit 314 calculates, based on second history information 175, the accuracy of identification of nuisance calls based on shared list 173. First output unit 315 outputs the accuracy of identification of nuisance calls calculated by second calculation unit 314.

2. Operation

Communication system 1 performs generation processing of shared list 173, incoming-call-control processing, and calculation processing of the accuracy of identification of nuisance calls. In the generation processing of shared list 173, shared list 173 reflecting the incoming call history of each mobile phone terminal 10 or the rejection operation or permission operation performed on each mobile phone terminal 10, is generated. The generation processing of shared list 173 is performed by each mobile phone terminal 10, list distribution device 20, and list generation device 30. In the incoming-call-control processing, incoming calls to mobile phone terminal 10 are controlled based on shared list 173 generated in the generation processing, and also on rejection list 171 and permission list 172 that are stored in mobile phone terminal 10. The incoming-call-control processing is performed by each mobile phone terminal 10. In the calculation processing of the accuracy of identification of nuisance calls, a value representing the accuracy of identification of nuisance calls is calculated. The calculation processing is performed by list generation device 30.

2-1. Generation Processing of Shared List 173

Figure 14:
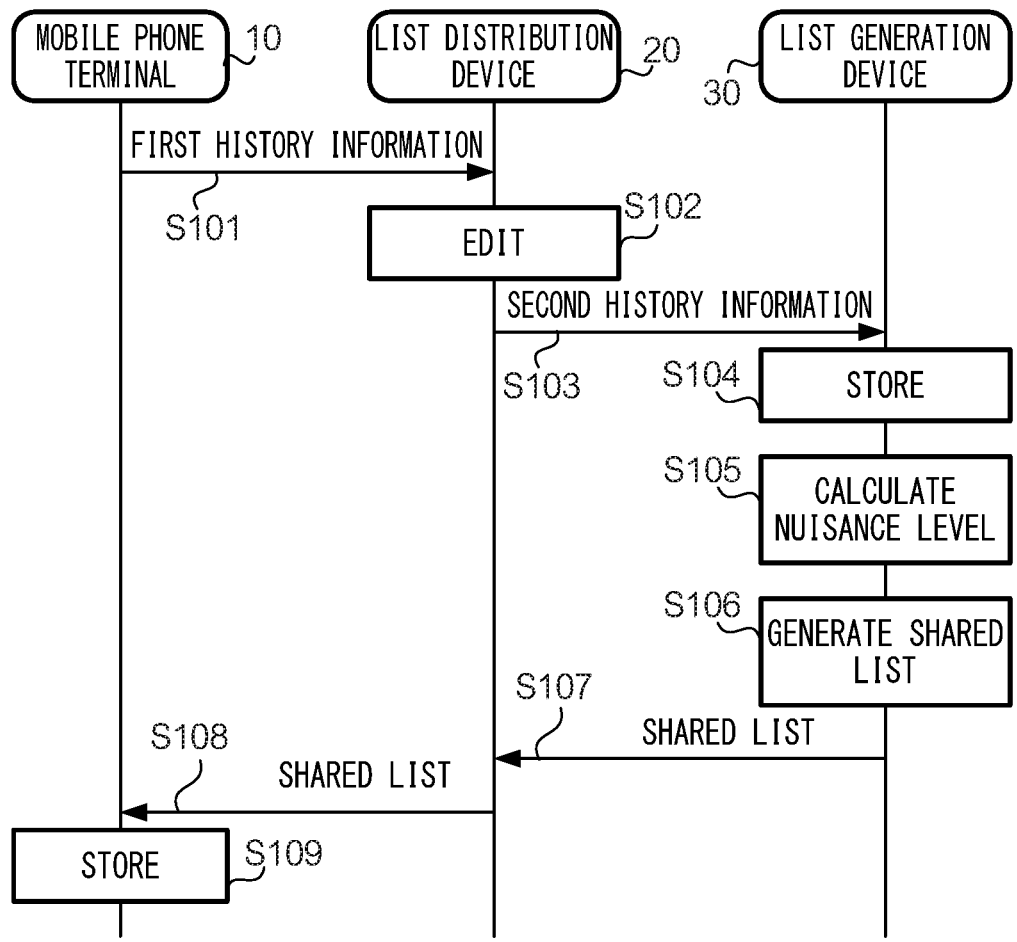
FIG. 14 is a sequence chart showing generation processing of a shared list.

FIG. 14 is a sequence chart showing generation processing of shared list 173. The generation processing starts at predetermined time intervals.

In step S101, second output unit 114 of mobile phone terminal 10 transmits first history information 174 to list distribution device 20 from communication unit 13 after adding the terminal ID of mobile phone terminal 10 to first history information 174 stored in storage unit 17. When list distribution device 20 receives first history information 174 at reception unit 211 via communication unit 23, the process proceeds to step S102.

In step S102, editing unit 212 edits first history information 174 received by reception unit 211 to generate second history information 175. FIG. 15 is a diagram showing an example of second history information 175. Second history information 175 includes, in addition to the terminal ID of mobile phone terminal 10 and information included in first history information 174, a number of an incoming call, a rejection number, and a permission number.

The number of an incoming call is the total number of times an incoming call is received at mobile phone terminal 10. For example, the number of an incoming call is calculated based on the telephone number of a caller and the date and time of the incoming call that are included in first history information 174. The rejection number is the total number of times a rejection operation is performed by a user of mobile phone terminal 10. The rejection number is calculated based on the operation information included in first history information 174. The permission number is the total number of times the permission operation is performed by the user of mobile phone terminal 10. The permission number is calculated based on the operation information included in first history information 174.

It is to be noted that, from the viewpoint of privacy, editing unit 212 may exclude, from first history information 174, some information that is not required for the generation processing of shared list 173.

Returning to FIG. 14, in step S103, transmission unit 213 transmits second history information 175 generated by editing unit 212 from communication unit 23 to list generation device 30. When list generation device 30 receives second history information 175 at communication unit 33, the process proceeds to step S104.

In step S104, first acquisition unit 311 stores received second history information 175 in storage unit 36. In this way, a plurality of items of second history information 175 that corresponds to a plurality of items of first history information 174 transmitted from a plurality of mobile phone terminals 10 is stored in storage unit 36.

In step S105, first acquisition unit 311 acquires, as input data, required information from second history information 175 and user evaluation DB 362 that are stored in storage unit 36. First calculation unit 312 calculates the nuisance level for a telephone number of each caller based on the input data acquired by first acquisition unit 311. When the nuisance level of the telephone number of the caller is already stored in shared DB 361, the nuisance level is recalculated to increase or decrease the stored nuisance level. Meanwhile, when the nuisance level of the telephone number of the caller is not stored in shared DB 361, the nuisance level is calculated to increase or decrease an initial value, using the initial value as the nuisance level. The initial value is, for example, "0."

The nuisance level is calculated based on at least two of the following twelve factors. The number of factors of the following twelve factors used for the calculation may be preferably four, more preferably six, further preferably eight, further more preferably ten, or most preferably twelve (all).

(1) Whether the user performs the rejection operation or the permission operation for the telephone number of the caller (2) When the user performs the rejection operation for the telephone number of the caller, whether another user who performs the permission operation for this telephone number satisfies a predetermined condition (3) Whether the incoming call from the telephone number of the caller has already been identified as a nuisance call (4) The upper limit of a value added by one user to the nuisance level of the telephone number of the caller (5) An area where mobile phone terminal 10 receiving the incoming call from the telephone number of the caller is used (6) A talk time in response to the incoming call received from the telephone number of the caller (7) A total number of users who perform the rejection operation for the telephone number of the caller (8) A call time of the incoming call received from the telephone number of the caller (9) A period of time during which the incoming call is received from the telephone number of the caller

(10) An evaluation value assigned to the user

(11) A number of times the rejection operation or permission operation is performed by the user during a predetermined period

(12) When the user performs the rejection operation for the telephone number of the caller, whether this telephone number is registered in a predetermined database (1) Whether the user performs the rejection operation or the permission operation for the telephone number of the caller When the rejection operation is performed for the telephone number of the caller, the incoming call from this telephone number may be a nuisance call. Constant a is therefore added to the nuisance level of this telephone number. This increases the nuisance level. Meanwhile, when the permission operation is performed for the telephone number of the caller, the incoming call from this telephone number may be a call other than a nuisance call. Constant a is therefore subtracted from the nuisance level of this telephone number. This decreases the nuisance level. When the nuisance level is calculated based on factor (1), the terminal ID, the telephone number of the caller, and the operation information that are included in second history information 175 are used as some examples of input data.

For example, when the terminal ID is "001," the telephone number of the caller is "03-5678-**," and the operation information is "1," it is determined that the rejection operation for "03-5678-" is performed by the user who is identified by terminal ID "001." In this case, constant a is added to the nuisance level of telephone number "03-5678-**."

However, when it is determined based on the input data that the same operation is performed for the telephone number of the same caller by one user a plurality of times, it is preferable that the second and subsequent operations are not reflected in the nuisance level. For example, when it is determined based on the input data that the rejection operation is performed for the telephone number "03-5678-****" twice by the user who is identified by terminal ID "001," only constant a is added to the nuisance level of this telephone number, instead of double constant a being added.

(2) When the user performs the rejection operation for the telephone number of the caller, whether another user who performs the permission operation for this telephone number satisfies a predetermined condition Even when the rejection operation is performed by a user for a telephone number of a caller, when, for example, the total number of other users who perform the permission operation for this telephone number reaches threshold T11, which is set for the total number of other users, or the evaluation value assigned to other users who perform the permission operation for this telephone number is greater than threshold T12, which is set for the evaluation values of other users, this telephone number will belong to a trusted caller. In this way, when the rejection operation is performed for the telephone number by the user, and another user who performs the permission operation for this telephone number satisfies a predetermined condition, constant a, which is to be added to the nuisance level of this telephone number, is multiplied by weighting coefficient w1 such that constant a decreases. Weighting coefficient w1 is, for example, greater than zero and smaller than one. Weighting coefficient w1 however may be zero. In this case, a value obtained from the multiplication of constant a by weighting coefficient w1 is added to the nuisance level of this telephone number of the caller. The value added to the nuisance level in this case is smaller than another value that is to be added to the nuisance level in above factor (1), namely constant a. When the nuisance level is calculated based on factor (2), the terminal ID, the telephone number of the caller, and the operation information that are included in second history information 175 are used as some examples of input data. Alternatively the terminal ID, the telephone number of the caller, and the operation information that are included in second history information 175, and also the evaluation value stored in user evaluation DB 362 are used as some examples of input data.

For example, as described in above factor (1), when it is determined that the user who is identified by terminal ID "001" performs the rejection operation for telephone number "03-5678-**," the total number of users who perform the permission operation for this telephone number is calculated based on the input data. When the total number of users reaches threshold T11, the caller of telephone number "03-5678-**" is regarded as a trusted caller.

For example, as described in above factor (1), when it is determined that the user who is identified by terminal ID "001" performs the rejection operation for telephone number "03-5678-**," and it is also determined based on the input data that the user who is identified by terminal ID "002" performs the permission operation for this telephone number, the evaluation value corresponding to the terminal ID "002" is extracted from user evaluation DB 362. When the extracted evaluation value is greater than threshold T12, telephone number "03-5678-**" is regarded as belonging to a trusted caller.

In this way, when the telephone number "03-5678-****" is regarded as belonging to a trusted caller, a value obtained from the multiplication of constant a by weighting coefficient w1 is added to the nuisance level of this telephone number. The value added to the nuisance level in this case is smaller than another value that is to be added to the nuisance level when the telephone number of the caller is not regarded as a trusted caller, namely constant a.

(3) Whether the incoming call from the telephone number of the caller has already been identified as a nuisance call When an incoming call is made from a telephone number registered in shared list 173, this means that this incoming call has already been identified as a nuisance call. In this case, this incoming call is likely to be a malicious nuisance call. Constant b is therefore added to the nuisance level of this telephone number. This increases the nuisance level. Constant b (an example of a variation in the nuisance level affected by factor (3)) is, however, usually smaller than constant a (an example of a variation in the nuisance level affected by factor (1)). When the nuisance level is calculated based on factor (3), the telephone number of the caller and the identification result that are included in second history information 175 are used as some examples of input data.

For example, when the telephone number of the caller is "03-3456-**," and the identification result is "3," it is determined that the incoming call is made from telephone number "03-3456-" that is already included in shared list 173. In this case, constant b is added to the nuisance level of telephone number "03-3456-**."

(4) The upper limit of a value added by one user to the nuisance level of the telephone number of the caller To prevent the telephone number of one caller from being registered in shared list 173 only based on a value added by one user to the nuisance level of this telephone number, an upper limit of the sum of the value added by one user to the telephone number of one caller is set in advance. The upper limit is smaller than threshold T1, which is used to determine whether a telephone number is registered in shared list 173. When the sum of the values added by one user to the nuisance level of the telephone number of one caller exceeds the upper limit, the excess value of the upper limit is not added to this nuisance level. The value added by the user may be added based on the incoming call received at mobile phone terminal 10 used by the user, or based on the rejection operation performed by the user. When the nuisance level is calculated based on factor (4), the terminal ID and the telephone number of the caller that are included in second history information 175 are used as some examples of input data.

For example, when it is determined that mobile phone terminal 10 identified by terminal ID "001" receives an incoming call N times from telephone number "03-3456-**" that has already been included in shared list 173, in above factor (3) the added value to the nuisance level of this telephone number is obtained from the multiplication of constant b by value N. However, when this added value is greater than the upper limit, the upper limit is added to the nuisance level of telephone number "03-3456-," instead of the value obtained from the multiplication of constant b by value N being added. It is to be noted that when the user who is identified by terminal ID "001" already adds some value to the nuisance level of telephone number "03-3456-," the difference between the upper limit and the already added value is added to the nuisance level of this telephone number. When the user performs the permission operation for telephone number "03-3456-**," constant a is subtracted from the sum of the values added by this user to the nuisance level of this telephone number.

(5) An area where mobile phone terminal 10 receiving the incoming call from the telephone number of the caller is used When nuisance calls are made to users in an area having a great number of users, the nuisance level is likely to increase since the population is large. Meanwhile when nuisance calls are made to users in an area having a small number of users, the nuisance level is unlikely to increase since the population is small. To reduce the influence of the difference between the numbers of users these areas, the value added to the nuisance level is weighted based on the number of users in the area where mobile phone terminal 10 is used.

Specifically, when the number of users in an area where mobile phone terminal 10 is used is smaller than threshold T13 (an example of a second threshold), which is set to the number of users in the area, constant a to be added to the nuisance level in above factor (1), or constant b to be added to the nuisance level in above factor (3) is multiplied by weight coefficient w2 such that constant a or constant b increases. Weight coefficient w2 is, for example, greater than one and smaller than two. In this case, not only constant a but also the variation caused by weight coefficient w2, namely the variation delta L1=constant a (or constant b)×weighting coefficient w2−constant a (or constant b) is added to the nuisance level. This increases the nuisance level. It is to be noted that the variation delta l1 (an example of a variation in the nuisance level affected by factor (5)) is smaller than constant a (an example of a variation in the nuisance level affected by factor (1)). When the nuisance level is calculated based on factor (5), the terminal ID, the telephone number of the caller, and the operation information that are included in second history information 175 are used as some examples of input data.

For example, as described in the above (1), when it is determined that the user who is identified by terminal ID "001" performs the rejection operation for "03-5678-**," the area code is extracted from the telephone number of the caller of the incoming call received at mobile phone terminal 10 that is identified by terminal ID "001." The area corresponding to the most extracted area code is then determined as the area where mobile phone terminal 10 is used. For example, when the number of users who use the incoming-call-rejection service in the determined area is smaller than threshold T13, the value obtained from the multiplication of constant a by weighting coefficient w2 is added to the nuisance level of telephone number "03-5678-**." The value added to the nuisance level in this case is greater than another value that is to be added to the nuisance level of the telephone number of the caller when the users who use mobile phone terminal 10 are in the area where the user number is greater than or equal to threshold T13, namely constant a.

(6) A talk time in response to the incoming call received from the telephone number of the caller When the rejection operation is performed for the telephone number of the caller after talking is performed in response to the incoming call received from this telephone number, this rejection operation will have high reliability. Therefore, when the talk time in response to the incoming call from the telephone number of the caller is greater than zero, and the rejection operation is performed for this telephone number, constant a, which is to be added to the nuisance level of the telephone number of this caller, is multiplied by weighting coefficient w3 such that constant a increases. Weighting coefficient w3 is, for example, greater than one and smaller than two. In this case, not only constant a but also the variation caused by weighting coefficient w3, namely the variation delta l2=constant a×weighting coefficient w3−constant a is added to the nuisance level. This increases the nuisance level. It is to be noted that the variation delta l2 (an example of a variation in the nuisance level affected by factor (6)) is smaller than constant a (an example of a variation in the nuisance level affected by factor (1)). When the nuisance level is calculated based on factor (6), the telephone number of the caller, the operation information, and the talk time that are included in second history information 175 are used as some examples of input data.

For example, when the telephone number of the caller is "03-5678-**," the operation information is "1," and the talk time is "10," it is determined that the rejection operation is performed for the incoming call from telephone number "03-5678-" after talking is performed for ten seconds. In this case, the value obtained from the multiplication of constant a by weight coefficient w3 is added to the nuisance level of telephone number "03-5678-**." The value added to the nuisance level in this case is greater than another value that is to be added to the nuisance level of the telephone number of the caller when the rejection operation is performed for this telephone number without any talk time taking place in response to the incoming call from this telephone number, namely constant a.

(7) A total number of users who perform the rejection operation for the telephone number of the caller (7-1) When the total number of users who perform the rejection operation for the same telephone number during a predetermined period reaches threshold T14 (an example of a third threshold), an incoming call from the telephone number is likely to be a nuisance call. Therefore, constant a, which is to be added to the nuisance level of the telephone number of this caller, is multiplied by weighting coefficient w4 such that constant a increases. Weighting coefficient w4 is, for example, greater than one and smaller than two. In this case, not only constant a but also the variation caused by weighting coefficient w4, namely the variation delta l3=constant a×weighting coefficient w4−constant a is added to the nuisance level. This increases the nuisance level. It is to be noted that the variation delta l3 (an example of a variation in the nuisance level affected by factor (7)) is smaller than constant a (an example of a variation in the nuisance level affected by factor (1)). When the nuisance level is calculated based on factor (7-1), the terminal ID, the telephone number of the caller, the operation information, and the date and time of the registration that are included in second history information 175 are used as some examples of input data.

For example, as described in the above (1), when it is determined that the user who is identified by terminal ID "001" performs the rejection operation for telephone number "03-5678-**," the total number of users who perform the rejection operation for this telephone number during the predetermined period is calculated based on the input data. When the total number of users reaches threshold T14, the value obtained from the multiplication of constant a by weighting coefficient w4 is multiplied by the number of users, and the multiplied value is added to the nuisance level of telephone number "03-5678-." The value added to the nuisance level in this case is greater than another value that is to be added to the nuisance level when the total number of users who perform the rejection operation for this telephone number during the predetermined period does not reach threshold T14**, namely constant a.

(7-2) When the total number of users who perform the rejection operation for the same telephone number during the predetermined period is zero, the incoming call from the telephone number of this caller may have already become to a trusted call. Constant c is therefore subtracted from the nuisance level of the telephone number of this caller. This decreases the nuisance level. When the nuisance level is calculated based on factor (7-2), the telephone number of the caller and identification result that are included in second history information 175 are used as some examples of input data.

For example, when the telephone number of the caller is "03-3456-**" and the identification result is "3," it is determined that the incoming call from the telephone number "03-3456-" is rejected since the telephone number of the caller is included in shared list 173. In this case, the total number of users who perform the rejection operation for this telephone number during the predetermined period is calculated. When the total number of users is zero, constant c is subtracted from the nuisance level of telephone number "03-3456-**."

(8) A call time of the incoming call received from the telephone number of the caller (8-1) When a call time of the incoming call received from the telephone number of the caller is smaller than threshold T15 (an example of a fourth threshold), which is set for the call time, this incoming call may be a nuisance call such as so-called "one-ring phone scam." Therefore, when the call time of the incoming call from the telephone number of the caller is smaller than threshold T15, and the rejection operation is performed for this telephone number, constant a, which is to be added to the nuisance level of the telephone number of this caller, is multiplied by weighting coefficient w5 such that constant a increases. Weighting coefficient w5 is, for example, greater than one and smaller than two. In this case, not only constant a but also the variation caused by weighting coefficient w5, namely the variation delta l4=constant a×weighting coefficient w5−constant a is added to the nuisance level. This increases the nuisance level. It is to be noted that the variation delta l4 (an example of a variation in the nuisance level affected by factor (8)) is smaller than constant a (an example of a variation in the nuisance level affected by factor (1)). When the nuisance level is calculated based on factor (8-1), the telephone number of the caller, the operation information, and the call time that are included in second history information 175 are used as some examples of input data.

For example, when the telephone number of the caller is "03-5678-**," the operation information is "1," and the call time is "0," it is determined that an incoming call with a very short call time is made from telephone number "03-5678-," and the rejection operation is performed to this telephone number after the incoming call. In this case, the value obtained from the multiplication of constant a by weighting coefficient w5 is added to the nuisance level of telephone number "03-5678-." The value added to the nuisance level in this case is greater than another value that is to be added to the nuisance level when the call time of the incoming call from the telephone number of the caller is greater than or equal to threshold T15**, namely constant a.

(8-2) When the call time of the incoming call of the telephone number of the caller is smaller than threshold T15, constant d may be added to the nuisance level of the telephone number of the caller regardless of whether the rejection operation is performed for this telephone number. Constant d is, however, smaller than constant a. Constant d may be smaller than the variation delta l4. When the nuisance level is calculated based on factor (8-2), the telephone number of the caller and the call time that are included in second history information 175 are used as some examples of input data.

For example, when the telephone number of the caller is "03-3456-**," and the call time is "0," it is determined that an incoming call with a very short call time is made from telephone number "03-3456-." In this case, constant d is added to the nuisance level of telephone number "03-3456-**."

In the factor (8-2), constant d may be added to the nuisance level of the telephone number of the caller as long as the total number of users who received a similar incoming call from the telephone number of the caller reaches threshold T16, which is set for the total number of users. In this case, the total number of users who received the incoming call with a very short call time from telephone number "03-3456-**" is calculated based on the input data. As long as the total number of users reaches threshold T16, constant d is added to the nuisance level of telephone number "03-3456-**."

(9) A period of time during which the incoming call is received from the telephone number of the caller (9-1) When an incoming call is received from the telephone number of the caller in a predetermined period when calls are generally not made, such as late night or early morning, the incoming call from this telephone number may be a nuisance call. When the incoming call is received during this period, and the rejection operation is performed for the telephone number of the caller, constant a, which is to be added to the nuisance level of the telephone number of the caller is therefore multiplied by weighting coefficient w6 such that constant a increases. Weighting coefficient w6 is, for example, greater than one and smaller than two. In this case, not only constant a but also the variation caused by weighting coefficient w6, namely the variation delta l5=constant a×weighting coefficient w6−constant a is added to the nuisance level. This increases the nuisance level. It is to be noted that the variation delta l5 (an example of a variation in the nuisance level affected by factor (9)) is smaller than constant a (an example of a variation in the nuisance level affected by factor (1)). When the nuisance level is calculated based on factor (9-1), the telephone number of the caller, the operation information, and the time and date of the incoming call that are included in second history information 175 are used as some examples of input data.

For example, when the telephone number of the caller is "03-5678-**," the operation information is "1", and the date and time of the incoming call are "Nov. 2, 2013, 2:00," it is determined that the incoming call is received from this telephone number late at night, and the rejection operation is performed for this telephone number. For example, when a late night period is set as the predetermined period, the value obtained from the multiplication of constant a by weighting coefficient w6 is added to the nuisance level of telephone number "03-5678-**." The value added to the nuisance level in this case is greater than another value that is to be added to the nuisance level when the incoming call is received during a period of time other than the predetermined period, and the rejection operation is performed for the telephone number of the caller, namely constant a.

(9-2) When an incoming call is received from the telephone number of the caller during the predetermined period, constant e may be added to the nuisance level of the telephone number of this caller regardless of whether the rejection operation is performed for this telephone number. Constant e is, however, smaller than constant a. Constant e may be smaller than the variation delta l5. When the nuisance level is calculated based on factor (9-2), the telephone number of the caller, the identification result, and the date and time of the incoming call that are included in second history information 175 are used as some examples of input data.

For example, when the telephone number of the caller is "03-3456-**," the identification result is "3," and the date and time of the incoming call are "Nov. 1, 2013, 4:00," it is determined that the incoming call is received from telephone number "03-3456-" included in shared list 173 late at night. For example, when a late night period is set as the predetermined period, constant e is added to the nuisance level of telephone number "03-3456-**."

(10) An evaluation value assigned to the user

When an evaluation value assigned to the user who performs the rejection operation or the permission operation is greater than threshold T17 (an example of a fifth threshold), which is set for the evaluation value of the user, the rejection operation or the permission operation will have high reliability. Constant a, which is to be added to or which is to be subtracted from the nuisance level of the telephone number of the caller based on the rejection operation or the permission operation, is therefore multiplied by weighting coefficient w7 such that constant a increases. Weighting coefficient w7 is, for example, greater than one and smaller than two. In this case, for example, when the user performs the rejection operation, not only constant a but also the variation caused by weighting coefficient w7, namely the variation delta l6=constant a×weighting coefficient w7−constant a is added to the nuisance level. This increases the nuisance level. It is to be noted that the variation delta l6 (an example of a variation in the nuisance level affected by factor (10)) is smaller than constant a (an example of a variation in the nuisance level affected by factor (1)). When the nuisance level is calculated based on factor (10), the terminal ID, the telephone number of the caller, the operation information that are included in second history information 175, and the evaluation value stored in user evaluation value DB 362 are used as some examples of input data.

For example, as described in the above (1), when it is determined that the user identified by terminal ID "001" performs the rejection operation for telephone number "03-5678-**," the evaluation value corresponding to terminal ID "001" is extracted from user evaluation DB 362. When the extracted terminal ID is greater than threshold T17, the value obtained from the multiplication of constant a by weighting coefficient w7 is added to the nuisance level of telephone number "03-5678-**." The value added to the nuisance level in this case is greater than another value that is to be added to the nuisance level of the telephone number of the caller when the evaluation value assigned to the user who performs the rejection operation is smaller than or equal to threshold T17, namely constant a.

(11) A number of times the rejection operation or permission operation is performed by the user during a predetermined period When a number of times the rejection operation or permission operation is performed by one user during a predetermined period of time is greater than threshold T18 (an example of a sixth threshold), which is set for the number of times of the rejection operation or the permission operation, the user may be performing the rejection operation or the permission operation with impropriety. The rejection operation or permission operation performed by this user is therefore not reflected in the nuisance level. When the nuisance level is calculated based on factor (11), the terminal ID, the telephone number of the caller, the operation information, and the date and time of the registration that are included in second history information 175 are used as some examples of input data.

For example, the number of times the rejection operation or permission operation is performed by the user identified by terminal ID "001" is calculated based on the input data. When the calculated number of times is greater than threshold T18, the rejection operation or permission operation performed by this user is regarded as an improper operation. The rejection operation or permission operation performed by this user is therefore not reflected in any nuisance level. In other words, the rejection operation or permission operation performed by this user does not cause any nuisance level to vary.

In factor (11), the rejection operation or permission operation performed by this user may be regarded as an improper operation as long as the evaluation value of this user is smaller than threshold T19, which is set as the evaluation value of the user. In this case, a terminal ID, the telephone number of the caller, the operation information, and the date and time of the registration that are included in the second history information 175, and the evaluation value stored in user evaluation DB 362 are used as some examples of input data.

For example, when it is determined based on the input data that the number of times the rejection operation or permission operation is performed by the user identified by terminal ID "001" during the predetermined period is greater than threshold T18, the evaluation value corresponding to this terminal ID is extracted from user evaluation DB 362. When the extracted evaluation value is smaller than threshold T19, the rejection operation or permission operation performed by this user is regarded as an improper operation.

In factor (11), the rejection operation or permission operation performed by the user may be regarded as an improper operation as long as the number of incoming calls to mobile phone terminal 10 used by this user is smaller than threshold T20, which is set for the number of incoming calls.

(12) When the user performs the rejection operation for the telephone number of the caller, whether this telephone number is registered in a predetermined database Telecommunications carriers may provide a database in which telephone numbers of shops or companies are registered. A telephone number not registered in such a predetermined database may have lower reliability than a telephone number registered in the predetermined database. When a telephone number for which the rejection operation is performed is not registered in a predetermined database, constant a, which is to be added to the nuisance level of the telephone number of this caller, is therefore multiplied by weighting coefficient w8 such that constant a increases. Weighting coefficient w8 is, for example, greater than one and smaller than two. In this case, not only constant a but also the variation caused by weighting coefficient w8, namely the variation delta l7=constant a×weighting coefficient w8−constant a is added to the nuisance level. This increases the nuisance level. It is to be noted that the variation delta l7 (an example of a variation in the nuisance level affected by factor (12)) is smaller than constant a (an example of a variation in the nuisance level affected by factor (1)). When the nuisance level is calculated based on factor (12), the telephone number of the caller and the operation information that are included in second history information 175 are used as some examples of input data.

For example, when the telephone number of the caller is "03-5678-**," and the operation information is "1," it is determined that the rejection operation is performed for telephone number "03-5678-." In this case, it is determined whether telephone number "03-5678-" is stored in the predetermined database by access to the predetermined database. When it is determined that telephone number "03-5678-**" is not stored in the predetermined database, the value obtained from the multiplication of constant a by weighting coefficient w8 is added to the nuisance level of this telephone number. The value added to the nuisance level in this case is greater than another value that is to be added to the nuisance level when the telephone number for which the rejection operation is performed is registered in the predetermined database, namely constant a.

Returning to FIG. 14, in step S106, generation unit 313 extracts the telephone number of a caller whose nuisance level calculated by first calculation unit 312 is greater than or equal to threshold T1, to generate shared list 173 including the extracted telephone number.

Figure 16:
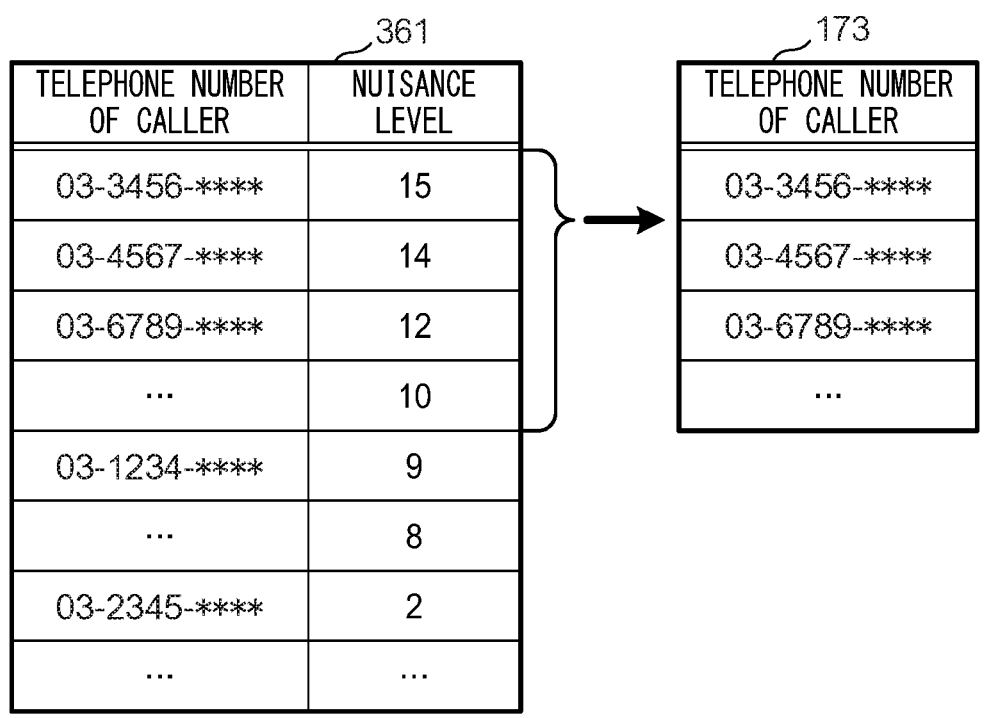
FIG. 16 is a diagram showing an example of a generation method of a shared list.

FIG. 16 is a diagram showing an example of the generation method of shared list 173. In the example shown in FIG. 16, threshold T1 is set to "10." In this case, the telephone numbers whose nuisance levels are each greater than or equal to ten are extracted from shared DB 361, and shared list 173 including these telephone numbers is generated.

In step S107, first output unit 315 transmits shared list 173 generated by generation unit 313 from communication unit 33 to list distribution device 20. When list distribution device 20 receives shared list 173 at reception unit 211 via communication unit 23, the process proceeds to step S108.

In step S108, transmission unit 213 transmits shared list 173 received at reception unit 211 from communication unit 23 to mobile phone terminals 10. When each mobile phone terminal 10 receives shared list 173 by communication unit 13, the process proceeds to step S109.

In step S109, list management unit 115 stores received shared list 173 in storage unit 17. Thereafter, this shared list 173 is used in mobile phone terminals 10.

2-2. Incoming-Call-Control-Processing

Figure 17:
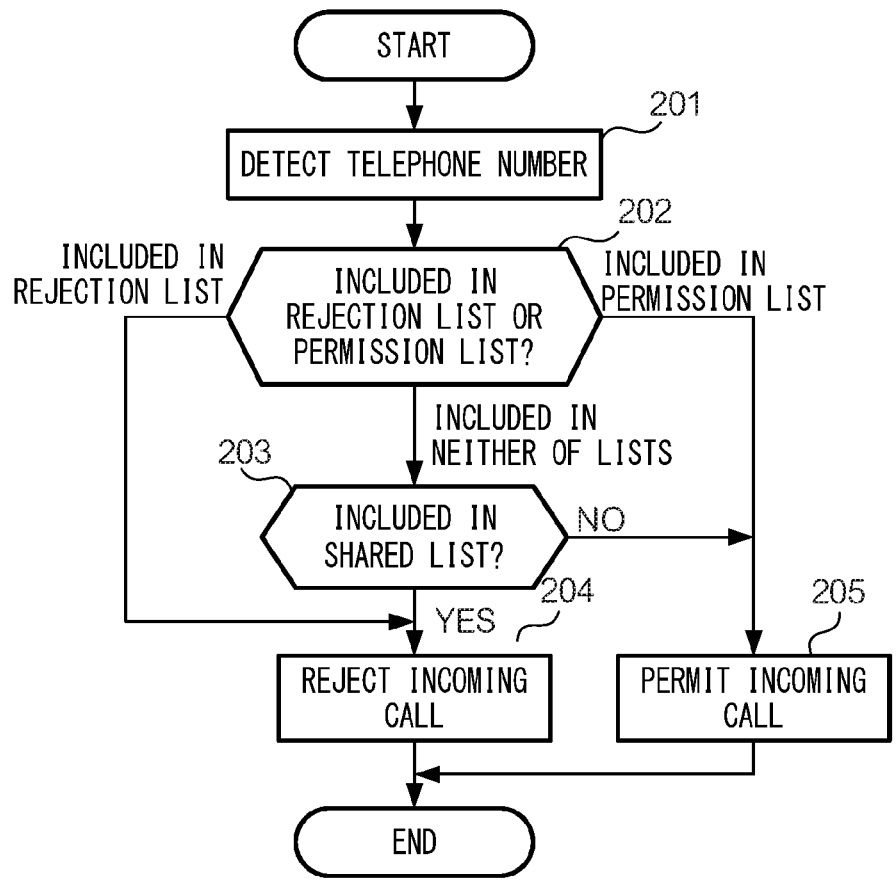
FIG. 17 is a flowchart showing an incoming-call-control processing.

FIG. 17 is a flowchart showing incoming-call-control processing. The incoming-call-control processing starts when mobile phone terminal 10 receives an incoming call.

In step S201, detection unit 111 detects the telephone number of the caller. For example, the telephone number is notified from mobile phone terminal 10 of the caller.

In step S202, identification unit 112 identifies whether the telephone number detected by detecting unit 111 is included in rejection list 171 or permission list 172. When the telephone number is included in rejection list 171, the incoming-call-control processing proceeds to step S204. In step S204, incoming-call-processing unit 113 rejects the incoming call. For example, the rejection of the incoming call is performed by the disconnection of the call connection.

Meanwhile, in step S202 when the telephone number detected by detecting unit 111 is included in permission list 172, the incoming-call-control processing proceeds to step S205. In step S205, incoming-call-processing unit 113 permits the incoming call. In this case, the user is allowed to talk to the caller using mobile phone terminal 10.

Meanwhile, in step S202 when the telephone number detected by detection unit 111 is included in neither rejection list 171 nor permission list 172, the incoming-call-control processing proceeds to step S203. In step S203, identification unit 112 identifies whether the telephone number detected by detection unit 111 is included in shared list 173. When this telephone number is included in shared list 173 (step S203: YES), the incoming-call-control processing proceeds to above step S204. Meanwhile, when this telephone number is not included in shared list 173 (step S203: NO), the incoming-call-control processing proceeds to above step S205.

2-3. Calculation Processing of the Accuracy of Identification of Nuisance Calls

Figure 18:
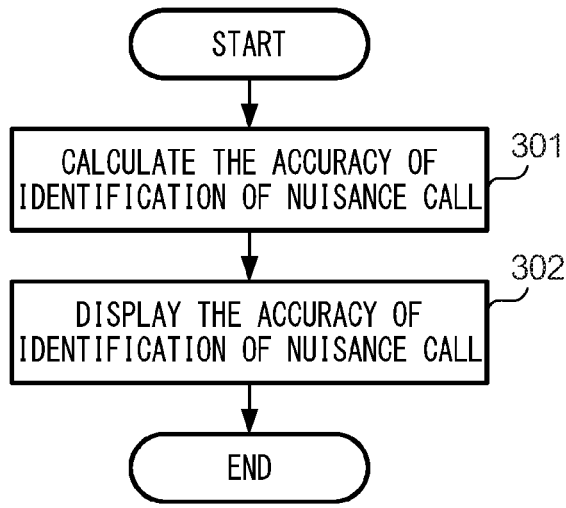
FIG. 18 is a flowchart showing calculation processing of the accuracy of identification of nuisance calls.

FIG. 18 is a flowchart showing calculation processing of the accuracy of identification of nuisance calls. This calculation processing starts at a predetermined timing. For example, the calculation processing may start when the administrator of list generation device 30 performs, using input unit 34, an operation to start calculation processing of the accuracy of identification of nuisance calls.

In step S301, second calculation unit 314 of list generation device 30 calculates the accuracy of identification of nuisance calls based on the number of incoming calls, the rejection number, and the permission number that are included in second history information 175 stored in storage unit 36. This accuracy of identification of nuisance calls is represented by a leakage rate of identification of nuisance calls and an erroneous identification rate of nuisance calls. The leakage rate of identification of nuisance calls is obtained from the calculation of the ratio of the number of telephone numbers for which the rejection operation is performed to the number of incoming calls from telephone numbers that are not included in any of rejection list 171, permission list 172, and shared list 173. Increasing the leakage rate of identification of nuisance calls means that the number of telephone numbers that are leaked from shared list 173 increases. The erroneous identification rate is obtained from the calculation of a ratio of the number of telephone numbers for which the permission operation is performed to the number of incoming calls from telephone numbers that are included in shared list 173. Increasing the erroneous identification rate of nuisance calls means that the number of telephone numbers that are erroneously registered in shared list 173 increases.

In step S302, first output unit 315 displays (outputs) on display unit 35 the accuracy of identification of nuisance calls calculated by second calculation unit 314. This accuracy of identification of nuisance calls is used for the verification of the accuracy of identification of nuisance calls based on shared list 173. For example, the accuracy of identification of nuisance calls increases as both the leakage rate of identification and the erroneous identification rate of nuisance calls decreases.

In the present embodiment, the nuisance level serving as the index used for the identification of nuisance calls is calculated based on at least two of the above factors (1) to (12). Thus, it is possible to increase the accuracy of identification of nuisance calls.

3. Modification

The present invention is not limited to the embodiment described above. For example, the embodiment may be modified as follows. The following modifications may be combined with each other. It should be understood that other modifications may be employed.

In the above embodiment, the nuisance level varies depending on at least two of the factors (1) to (12). However, threshold T1 may vary together with the variation in the nuisance level, or instead of the variation in the nuisance level.

Figure 19:
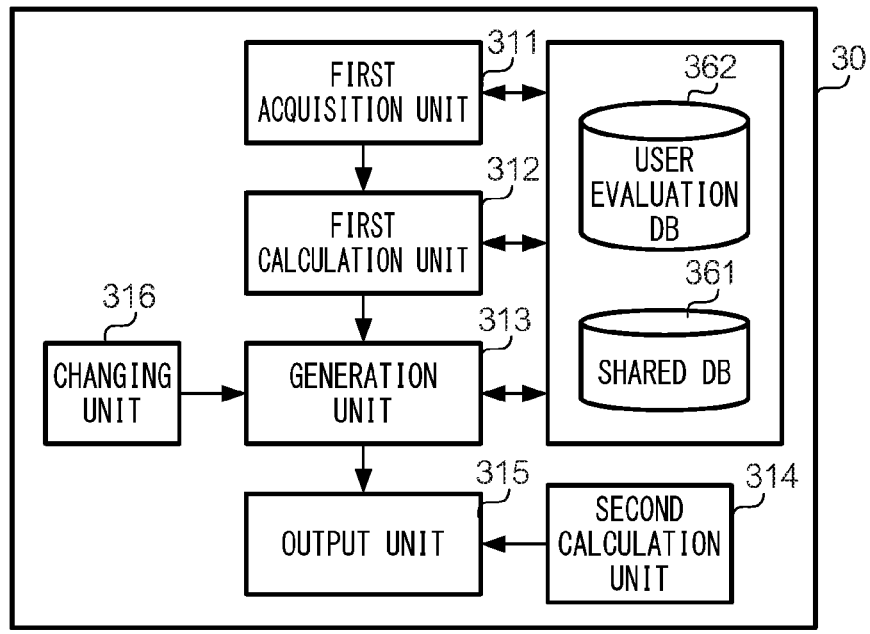
FIG. 19 is a diagram showing a functional configuration of the list generation device according to a modification.

FIG. 19 is a diagram showing a functional configuration of list generation device 30 according to the present modification. List generation device 30 according to the present modification serves as changing unit 316, in addition to first acquisition unit 311, first calculation unit 312, generation unit 313, second calculation unit 314, and first output unit 315 shown in FIG. 13, by processor 31 executing at least one program.

Changing unit 316 changes threshold T1 based on at least one of the above factors (2), (3), (5), (6), (7), (8), (9), (10) and (12).

Specifically, changing unit 316 may change threshold T1 such that threshold T1 used for the telephone number of the corresponding caller increases in the following case.

In above factor (2), in a case where the user performs the rejection operation for the telephone number of a caller, and another user who performs the permission operation for this telephone number satisfies the predetermined condition.

Changing unit 316 may change threshold T1 such that threshold T1 used for the telephone number of the corresponding caller decreases in the following cases.

In above factor (3), in the case where the incoming call is received from the telephone number of the caller that has already been registered in shared list 173

In above factor (5), in a case where the number of users in the area where mobile phone terminal 10 is used is smaller than threshold T13

In above factor (6), in a case where the rejection operation is performed for a telephone number after talking is performed in response to an incoming call received from the telephone number of the caller In above factor (7), in a case where the total number of users who perform the rejection operation for the same telephone number during the predetermined period reaches threshold T14

In above factor (8), in a case where the call time of an incoming call from the telephone number of the caller is smaller than threshold T15

In above factor (9), in a case where an incoming call is received from the telephone number of the caller in the predetermined period of time.

In the above factor (10), in a case where the evaluation value assigned to the user who performs the rejection operation or the permission operation is greater than threshold T17

In above factor (12), in a case where the telephone number for which the rejection operation is performed is not registered in the predetermined database In the embodiment described above, list generation device 30 may add a risk level to the telephone number of a caller included in shared list 173. The risk level is determined based on the nuisance level. The risk level is an example of a second index value of the present invention.

Figure 20:
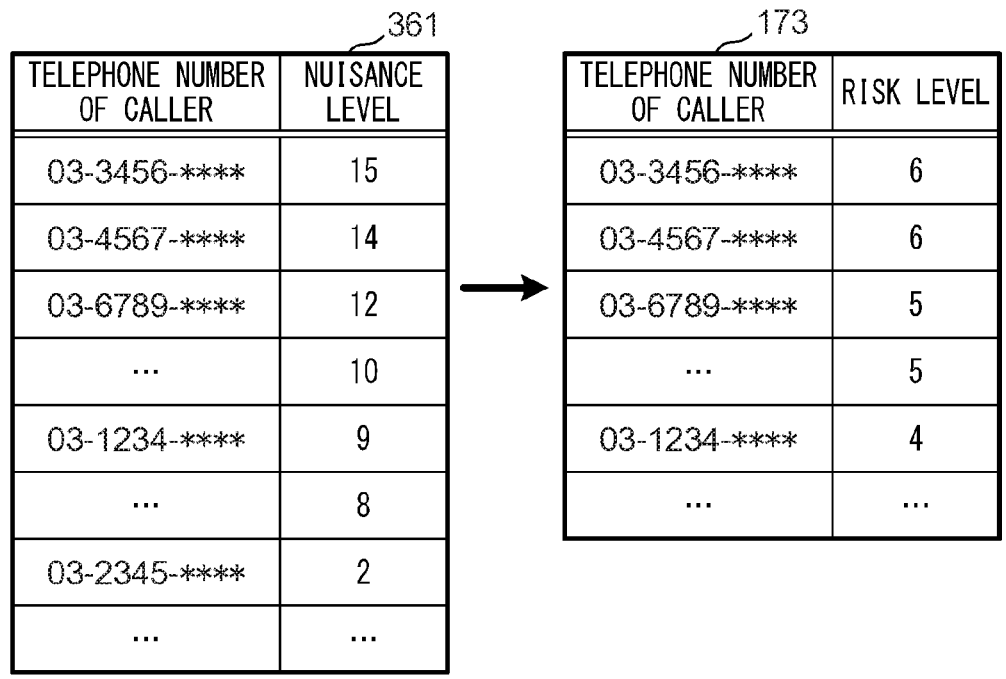
FIG. 20 is a diagram showing an example of a generation method of a shared list according to a modification.

FIG. 20 is a diagram showing an example of the generation method of shared list 173 according to the present modification. In the example shown in FIG. 20, the nuisance levels of the telephone numbers of the callers are converted into six risk levels from "1" to "6." Shared list 173 includes the risk levels together with the telephone numbers of the callers.

In this case, mobile phone terminal 10 performs predetermined processing based on the risk level included in shared list 173. The predetermined processing may be set by list generation device 30 or list distribution device 20, or alternatively may be set by an operation performed by the user of mobile phone terminal 10. For example, when an incoming call is received from the telephone number of a caller that is included in shared list 173, and the risk level of this telephone number is "6," mobile phone terminal 10 may reject this incoming call. Meanwhile, when the risk level of this telephone number is "4" or "5," mobile phone terminal 10 may notify that the incoming call from this telephone number may be a nuisance call, instead of rejecting the incoming call from this telephone number. This notification may be implemented by a display of a message such as "this incoming call may be a nuisance call," or by outputting of the message by voice. In this case, mobile phone terminal 10 may change the operation for notifying the incoming call such as a ringtone, a vibration, or an illumination to an operation other than the normal operation, or alternatively perform no operation for notifying the incoming call in this case. Alternatively, mobile phone terminal 10 may notify the user that the incoming call from the telephone number may be a nuisance call whenever the risk level of the telephone number of the caller is "4," "5," or "6."

In above factor (5), the area where mobile phone terminal 10 is used is determined based on the area code included in the telephone number of the caller. However, the method for determining the area where mobile phone terminal 10 is used is not limited to this method. For example, when mobile phone terminal 10 includes a GPS function, mobile phone terminal 10 may determine the area where mobile phone terminal 10 is used based on the position that is measured by the use of the GPS function. In this case, first history information 174 includes position information indicating the position measured by the use of the GPS function. The area where mobile phone terminal 10 is used may be determined based on the location of the base station to which mobile phone terminal 10 is connected.

In above factor (5), weighting coefficient w2 may be set based on the number of users in the area where mobile phone terminal 10 is used. Specifically, weighting coefficient w2 increases as the number of users in the area where mobile phone terminal 10 is used decreases. According to the present modification, it is possible further to reduce the influence of the difference between the numbers of users in different areas.

In the above embodiment, list generation unit 30 may recalculate the nuisance level stored in shared DB 361. In this case, storage unit 36 stores second history information 175 received from list distribution device 20. List generation device 30 returns the nuisance level stored in shared DB 361 to the initial value. List generation device 30 then calculates a new nuisance level by using, as input data, the information included in second history information 175 that is stored in storage unit 36 during a predetermined period.

In factor (2), factors (5) to (10), and factor (12) described in the above embodiment, weighting is performed by using the weighting coefficients. However, instead of the weighting using the weighting coefficients, a predetermined value may be added to or subtracted from the nuisance level.

For example, in above factor (5), when the number of users in the area where mobile phone terminal 10 is used is smaller than threshold T13, constant f may be added to the nuisance level of the telephone number of the corresponding caller. The telephone number of the corresponding caller refers to the telephone number for which the rejection operation or the permission operation is performed by the user of mobile phone terminal 10, or the telephone number of the caller who makes the incoming call received at mobile phone terminal 10. In above factor (7), when the total number of users who perform the rejection operation for the same telephone number during a predetermined period reaches threshold T14, constant g may be added to the nuisance level of this telephone number. In factor (12), when the telephone number for which the rejection operation is performed is not registered in the predetermined database, constant h may be added to the nuisance level of this telephone number.

In above factor (11), when the number of times the rejection operation or permission operation is performed by one user during the predetermined period is greater than threshold T18, the nuisance level is calculated without reflecting the rejection operation or permission operation performed by this user. However, the rejection operation or permission operation performed by this user may be reflected in the nuisance level in this case. In this case, however, constant a is multiplied by weighting coefficient w9 such that constant a decreases. Weighting coefficient w9 is, for example, greater than zero and smaller than one. In this case, the value obtained from the multiplication of constant a by weighting coefficient w9 is added to or is subtracted from the nuisance level of the telephone number of the caller. The value added to or subtracted from the nuisance level in this case is smaller than another value that is to be added to the nuisance level in factor (1), namely constant a.

Above first historical information 174 does not have to include all of the information shown in FIG. 7. For example, mobile phone terminal 10 extracts some information required to generate shared list 173 from the information shown in FIG. 7, and transmits the extracted information to list distribution device 20. Above second historical information 175 does not have to include all of the information shown in FIG. 15. Second history information 175 may include at least one of the terminal ID, the telephone number of the caller, the date and time of the incoming call, the talk time, the call time, the operating information, the date and time of the registration.

In the above embodiment, shared list 173 is transmitted from list distribution device 20 to mobile phone terminals 10. However, shared list 173 does not have to be transmitted to mobile phone terminals 10. In this case, each of mobile phone terminals 10 may inquire to list distribution device 20 or list generation device 30 whether the telephone number detected by detection unit 111 is included in shared list 173. In this case, identification unit 112 identifies, based on the response from list distribution device 20 or list generation device 30, whether the telephone number detected by detecting unit 111 is included in shared list 173.

In the above embodiment, list distribution device 20 is provided. However, list distribution device 20 does not have to be provided. In this case, list generation device 30 directly acquires first history information 174 from mobile phone terminals 10. List generation device 30 directly transmits generated shared list 173 to mobile phone terminals 10.

In the above embodiment, the present invention is applied to communication system 1 including mobile phone terminal 10. The present invention may, however, be applied to communication system 1 including a fixed-line telephone. In this case, for example, the fixed-line telephone is connected to the telephone line via an incoming-call-processing device. The incoming-call-processing device includes the same configuration as mobile phone terminal 10 described in the embodiment, with the exception of the configuration regarding a telephone. The incoming-call-processing device may include a rejection button used for the rejection operation and a permission button used for the permission operation. The fixed-line telephone may serve as, in addition to a telephone, the incoming-call-processing device performing the process of controlling incoming nuisance calls in a manner similar to that used in mobile phone terminal 10.

The programs executed by processor 11 of mobile phone terminal 10, processor 21 of list distribution device 20, and processor 31 of list generation device 30 may be downloaded via a communication line such as the Internet. These programs may be provided by being stored in a computer readable recording medium such as a magnetic recording medium (e.g., magnetic tape, magnetic disk), an optical recording medium (e.g., an optical disk), a magneto-optical recording medium, or a semiconductor memory.

First history information 174 may store information on a telephone number from which no incoming call is received. For example, when the user performs the rejection operation or the permission operation for the telephone number, first history information 174 may store this telephone number, the operation information, and the registration information even if no incoming call is received from this telephone number.

The telephone numbers registered in rejection list 171 or permission list 172 may be deleted from rejection list 171 or permission list 172 by an operation performed by the user. In this case, first history information 174 includes deletion information to show that the telephone number is deleted from rejection list 171 or permission list 172. List generation device 30 changes the nuisance level stored in shared DB 361 based on the deletion information. For example, when telephone number "03-1234-****" is deleted from rejection list 171, constant a is subtracted from the nuisance level of this telephone number.

In the above embodiment, an example is described in which mobile phone terminal 10 stores first history information 174 in storage unit 17, and transmits first history information 174 in list distribution device 20 at predetermined time intervals. However, mobile phone terminal 10 does not have to store first history information 174 in storage unit 17. For example, mobile phone terminal 10 may transmit to list distribution device 20 the above telephone number of the caller, date and time of incoming call, talk time, calling time, and identification result each time an incoming call is received. Mobile phone terminal 10 may transmit to list distribution device 20 the above operation information and date and time of the registration each time the user performs the rejection operation or the permission operation.

In the above embodiment, list generation unit 30 may perform the process of step S105 each time upon receiving second history information 175 from list distribution device 20.

In the above embodiment, when the telephone number of a caller is included in permission list 172, the incoming call is permitted regardless of whether this telephone number is included in shared list 173. However, even if the telephone number of the caller is included in permission list 172, when this telephone number is included in shared list 173, mobile phone terminal 10 may reject an incoming call from this telephone number. As shown in FIG. 20, when shared list 173 includes the risk level, mobile phone terminal 10 may perform predetermined processing corresponding to the risk level of this telephone number, as described in the above modification.

LIST OF TERMS

1: Communication system
10: Mobile phone terminal
20: List distribution device
30: List generation device
111: Detection unit
112: Identification unit
113: Incoming-call-processing unit
114: Second output unit
115: List management unit
211: Reception unit
213: Editing unit
213: Transmission unit
311: First acquisition unit
312: First calculation unit
313: Generation unit
314: Second calculation unit
315: First output unit
316: Changing unit

What is claimed is:

1. A system for identifying a nuisance call, the system comprising:
a list generation device; and
a plurality of incoming-call-processing devices;
the list generation device including:
  a memory;
  a processor configured to execute a program stored in the memory;
  a storage configured to store a list; and
  a communication interface configured to receive a plurality of sets of operation information representing a first operation to reject an incoming call from a telephone number of a caller or a second operation to permit the incoming call, the plurality of sets of operation information being sent from the plurality of incoming-call-processing devices;
the processor configured to:
  count, based on the received plurality of sets of operation information, a first total number of at least one first user who performs the first operation and a second total number of at least one second user who performs the second operation;
  calculate a nuisance level of the telephone number using the counted first total number and a first additional value;
  weight the first additional value upon an evaluation value assigned to the at least one first user being greater than a predetermined value;
  set the telephone number to a trusted telephone number belonging to a trusted caller to calculate the nuisance level using a second additional value smaller than the first additional value upon the calculated second total number being greater than or equal to a predetermined number; and
  add the telephone number to the list upon the calculated nuisance level being greater than or equal to a threshold; and
the plurality of incoming-call-processing devices each configured to perform predetermined processing upon a corresponding telephone receiving another incoming call from the telephone number included in the list.

2. The system according to claim 1, wherein the predetermined processing includes rejection of the other incoming call.

3. The system according to claim 1, wherein the processor is configured to calculate the nuisance level without adding a value in excess of an upper limit upon a sum of the first additional value or the second additional value to be added by a single user of the at least one first user exceeding the upper limit, the upper limit being smaller than the threshold.

4. The system according to claim 1, wherein the processor is configured to calculate the nuisance level without reflecting the first operation upon a number of times the first operation performed by a single user of the at least one first user within a predetermined term being greater than a predetermined number of times.

5. The system according to claim 1, wherein the processor is configured to change the threshold depending on an area where a telephone receiving the incoming call from the telephone number is used.

6. A list distribution device comprising:
a communication unit that transmits a list generated by a list generation device to a plurality of incoming-call-processing devices, and wherein
the list is generated by the steps of:
receiving a plurality of sets of operation information representing a first operation to reject an incoming call from a telephone number of a caller or a second operation to permit the incoming call, the plurality of sets of operation information being sent from the plurality of incoming-call-processing devices;
counting, based on the received plurality of sets of operation information, a first total number of at least one first user who performs the first operation and a second total number of at least one second user who performs the second operation;
 calculating a nuisance level of the telephone number using the counted first total number and a first additional value;
 weighting the first additional value upon an evaluation value assigned to the at least one first user being greater than a predetermined value;
 setting the telephone number to a trusted telephone number belonging to a trusted caller to calculate the nuisance level using a second additional value smaller than the first additional value upon the calculated second total number being greater than or equal to a predetermined number; and
 adding the telephone number to the list upon the calculated nuisance level being greater than or equal to a threshold; and
the plurality of incoming-call-processing devices each configured to perform predetermined processing upon a corresponding telephone receiving another incoming call from the telephone number included in the list.

7. An incoming-call-processing device comprising:
an incoming-call-processing unit that performs a predetermined processing upon a corresponding telephone receiving an incoming call from a telephone number included in a list, and wherein
the list is generated by the steps of:
receiving a plurality of sets of operation information representing a first operation to reject another incoming call from the telephone number of a caller or a second operation to permit the other incoming call, the plurality of sets of operation information being sent from a plurality of incoming-call-processing devices;
counting, based on the received plurality of sets of operation information, a first total number of at least one first user who performs the first operation and a second total number of at least one second user who performs the second operation;
 calculating a nuisance level of the telephone number using the counted first total number and a first additional value;
 weighting the first additional value upon an evaluation value assigned to the at least one first user being greater than a predetermined value;
 setting the telephone number to a trusted telephone number belonging to a trusted caller to calculate the nuisance level using a second additional value smaller than the first additional value upon the calculated second total number being greater than or equal to a predetermined number; and
 adding the telephone number to the list upon the calculated nuisance level being greater than or equal to a threshold.

8. A program stored on a non-transitory computer-readable medium for causing a computer to perform a step of performing a predetermined processing upon a corresponding telephone receiving an incoming call from a telephone number included in a list, and wherein
the list is generated by the steps of:
receiving a plurality of sets of operation information representing a first operation to reject another incoming call from the telephone number of a caller or a second operation to permit the other incoming call, the plurality of sets of operation information being sent from a plurality of incoming-call-processing devices;
counting, based on the received plurality of sets of operation information, a first total number of at least one first user who performs the first operation and a second total number of at least one second user who performs the second operation;
 calculating a nuisance level of the telephone number using the counted first total number and a first additional value;
 weighting the first additional value upon an evaluation value assigned to the at least one first user being greater than a predetermined value;
 setting the telephone number to a trusted telephone number belonging to a trusted caller to calculate the nuisance level using a second additional value smaller than the first additional value upon the calculated second total number being greater than or equal to a predetermined number; and
 adding the telephone number to the list upon the calculated nuisance level being greater than or equal to a threshold.

* * * * *